Figures 1, 2, 3:
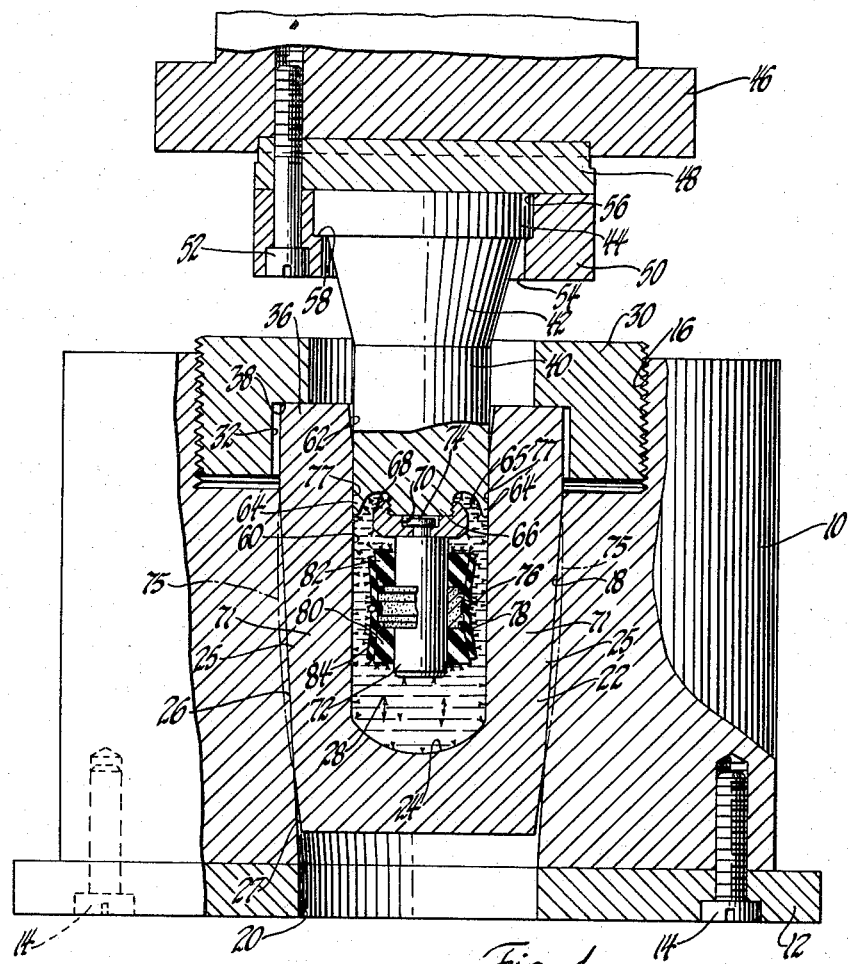

April 11, 1967

R. R. VOGEL ETAL 3,313,871

METHOD AND APPARATUS FOR HYDROSTATICALLY
COMPACTING METAL POWDERS

Filed Dec. 29, 1964

INVENTORS
Roger R. Vogel, &
BY Donald S. Mills

ATTORNEY

United States Patent Office 3,313,871
Patented Apr. 11, 1967

3,313,871
METHOD AND APPARATUS FOR HYDROSTATI-
CALLY COMPACTING METAL POWDERS
Roger R. Vogel, Lathrup Village, and Donald S. Mills, Berkley, Mich., assignors to General Motors Corporation, Detroit, Mich., a corporation of Michigan
Filed Dec. 29, 1964, Ser. No. 421,764
7 Claims. (Cl. 264—111)

This invention relates generally to a method and apparatus for compacting metal powders, and more particularly, to a hydrostatic compaction device.

Hydrostatic compaction is a well-known method of compacting metal powders and has been used in the powdered metallurgy art for many years. Conventional hydrostatic compaction devices normally include a pumping system having an external power source which actuates a piston or diaphragm to pressurize a fluid contained in the pressure chamber of a pressure vessel, thereby compacting the metal powder which is positioned therein in a flexible container. However, the pumping systems employed with conventional hydrostatic compaction devices normally require the use of elaborate and expensive check valves, tubing arrangements and sealing means associated both with and between the pump and pressure vessel to introduce and maintain the fluid under high pressure in the pressure chamber. Also, another disadvantage in conventional hydrostatic compaction devices is the slow process cycle time normally involved due to the time usually required to build up and maintain the desired amount of pressure on the fluid in the pressure vessel and the time required to load and unload the work in the pressure vessel after each compaction cycle.

It is a principal object of the present invention to provide a method of and a device for hydrostatically compacting metal powders in which the fluid pressurizing member or piston and the pressure vessel coact in a manner to form a self-sustaining, fluid-tight seal between the piston and pressure chamber walls during operation of the device, thereby preventing or greatly minimizing leakage of the pressurizing fluid from the pressure chamber and eliminating the need for elaborate and expensive seals which are commonly used in conventional hydrostatic compaction devices and which must frequently be replaced in high pressure, high volume applications.

It is another object of the present invention to provide a hydrostatic compaction device which may use any suitable power source or driving means which is capable of actuating the pressurizing member or piston to exert a high pressure on the fluid in the pressure chamber and which does not require the use of elaborate and expensive check valves, tubing arrangements and sealing means associated with or between the pump and the pressure vessel.

It is another object of the present invention to provide a relatively simple and inexpensive device for hydrostatically compacting powdered metal articles which automatically compensates for machine eccentricities and the elastic deformation of the piston and pressure vessel to prevent leakage of the pressurizing fluid from the pressure vessel during operation of the device.

It is another object of the present invention to provide a method of and a device for hydrostatically compacting metal powders, such as iron, steel, copper and tungsten powders, to form very dense powdered metal compacts or articles, wherein the handling problems and time involved in loading and unloading the work in the pressure vessel and the time involved in pressurizing the fluid in the pressure vessel are minimized, thereby reducing the process cycle time normally required for compacting powdered metal articles using conventional hydrostatic compaction devices.

These and other objects are accomplished in accordance with the present invention by providing a hydrostatic compaction device which includes a generally frusto-conical-shaped receptacle formed of a substantially non-elastic, hard, highly resilient material such as J.I.C. 0–1 tool steel and has a pressure chamber therein which is open at one end thereof and which contains a pressurizing fluid, a large retaining member preferably formed of a somewhat softer steel such as SAE 4340 steel having a generally conical bore therein which the receptacle is freely but snugly positioned, and a piston adapted to be driven into the opening in the chamber by any suitable external source of power capable of exerting a high pressure through the piston on the fluid in the chamber. The piston is adapted to snugly fit the walls defining the chamber during the pressurizing cycle and preferably is provided with seal means for minimizing or preventing leakage of the fluid from the chamber during operation of the device. The metal powder to be compacted is positioned in any suitable flexible container or mold within the pressure chamber in a manner such that when the fluid is pressurized, the container will be subject to sufficient pressure to cause the metal powder therein to be compacted into the desired shape of the resultant powdered metal article or compact.

In operation, when the piston is driven down into the pressure chamber of the receptacle to exert the desired amount of pressure on the fluid in the chamber to properly compact the metal powder within its container, the forces acting on the receptacle cause it to be driven down or wedged deeper into the conical bore of the retaining member. In this operation, the outwardly directed fluid pressure on the inner receptacle walls defining the pressure chamber causes a slight outward expansion of the retaining member within its elastic limit to permit downward movement of the receptacle into the retaining member which is compensated for and offset by an opposed inwardly directed pressure on the outer conical walls of the receptacle due to the resistance of the retaining member to elastic deformation, as the receptacle is being driven or wedged deeper into the conical bore of the retaining member. Hence, as a result of this compensation of pressures acting on the outer and inner receptacle walls during the pressurizing cycle of operation, a constant receptacle bore size in cooperation with the piston seal means prevents leakage of the fluid therefrom during operation of the device.

Other features and advantages of the present invention will become apparent from the following detailed description of certain embodiments thereof taken in conjunction with the accompanying drawing, in which:

FIGURE 1 is a vertical elevational view, with parts broken away and in section, of one embodiment of the subject hydrostatic compaction device of the present invention in which a compacted powdered metal article is being formed during the pressurizing or compaction cycle of operation;

FIGURE 2 is a vertical elevational view, with parts broken away and in section, of a second embodiment of the hydrostatic compaction device of the present invention in which a compacted powdered metal article is being formed during the pressurizing or compaction cycle of operation; and FIGURE 3 is a perspective view of a typical compacted powdered metal article which may be produced in accordance with the subject invention utilizing either embodiment of the subject hydrostatic compaction device as shown in FIGURES 1 and 2 of the drawing.

Referring more specifically to FIGURE 1 of the drawing, a large metal retaining member or block 10 is mounted on a base plate 12 and may be affixed thereto by any suitable means, such as bolts 14. The retaining block 10 has a threaded, generally cylindrical recess or counterbore 16 in its upper end which is in communication with an inwardly sloping conical bore 18 extending downwardly through the retaining block to an opening 20 in the base plate 12. The retaining block 10 is preferably formed of a relatively hard and highly resilient material such as SAE 4340 steel. A generally frusto-conical-shaped metal receptacle 22 having a generally cylindrical pressure chamber 24 therein which opens upwardly is freely but snugly positioned in mating engagement with the walls defining the conical bore 18 in the retaining block 10. The receptacle 22 may also be formed of a hard resilient material such as SAE 4340 steel but is preferably formed of a harder material such as J.I.C. 0–1 tool steel. The outer conical wall 26 of the receptacle 22 and the conical bore 18 in the retaining block 10 should have the same degree of taper, the angle of which may vary depending on the pressures for which the device is designed to operate. However, an angle of taper ranging between about 2° to about 10°, such as about 7°, to the axis of the bore for a pressure operating range of up to about 120,000 p.s.i. is suitable in most instances. The outer lower portion 27 of the receptacle 22 is tapered at a slightly greater angle than the conical bore 18 in the retaining block 10 to facilitate the wedging of the receptacle deeper into the bore 18 of the retaining block 10 during operation of the device, as will hereinafter be more fully explained.

The pressure chamber 24 may contain any suitable liquid or fluid 28, such as water or oil, for use as the pressurizing fluid for compacting the metal powder which is positioned therein in a flexible container, as will hereinafter be more fully explained. An annular threaded retaining ring 30 is secured in the cylindrical recess 16 in the retaining block 10. The retaining ring 30 has an annular recess 32 in its lower portion to accommodate the upper portion 36 of the receptacle. Also, this recess 32 provides a shoulder 38 which will abut the upper portion of the receptacle, thereby maintaining the receptacle in the conical bore 18 of the retaining block 10 when the generally cylindrical piston 40 is retracted from the pressure chamber 24 on completion of the pressurizing cycle of operation.

The piston 40 has a conical upper portion 42 and a generally cylindrical top flanged portion 44 which is secured to an externally powered driving member or press member 46 by any suitable means. As shown in FIGURE 1 of the drawing, this may be conveniently accomplished by means of retaining members 48 and 50 which are secured to the driving member 46 by means of bolts 52, the latter retaining member 50 having a cylindrical opening 54 therein and a recess 56 forming an annular shoulder 58 which securely engages the top flanged portion 44 of the piston 40. The driving member 46 may be connected to any suitable source of external power (not shown in the drawing) which is capable of exerting a force on the piston 40 to drive it into the pressure chamber 24 of the receptacle 22, thereby exerting the desired amount of pressure on the fluid 28 located therein during the pressurizing or compaction cycle of operation.

As previously stated, during the compaction or pressurizing cycle of operation, the piston 40 is driven into the pressure chamber 24 of the receptacle 22 by the externally powered press member 46 to exert the desired amount of pressure on the fluid 28 in the chamber. However, in accordance with the present invention, the piston must snugly fit the cylindrical pressure chamber walls 60 to provide a self-sealing, fluid-tight engagement therebetween during the pressurizing cycle of operation in order to prevent or greatly mimimize leakage of the fluid from the chamber. Hence, the piston should preferably be slightly larger in diameter than the pressure chamber walls 60 to form a slight interference fit therebetween, although a piston having the same diameter as the chamber walls can also be used. Also, the upper interior pressure chamber wall 62 of the receptacle 22 is preferably tapered to facilitate introduction of the piston into the pressure chamber 24.

The chamber walls 60 and/or the piston 40 may also be provided with a suitable lubricating coating to facilitate the introduction of the piston into the pressure chamber during the pressurizing cycle of operation and to permit these mating members to move relative to each other under the high pressures required for leak free sealing without scoring. Also, the conical bore 18 and/or the outer receptacle wall 26 are preferably lubricated to prevent scoring or locking of the receptacle 22 in the bore 18 during operation of the device. A lubricant coating such as a very thin iron phopshate coating which is chemically bonded to one or both of the mating surfaces is particularly suitable for this purpose.

In the preferred embodiment of the invention as shown in FIGURE 1 of the drawing, the working or lower portion of the piston 40 is provided with an annular recess portion 65 intermediate the longitudinal axis of the piston and the outer cylindrical surface thereof which slopes gradually inwardly of the cylindrical wall of the piston to thereby provide a relatively thin flexible lip 64 defined by the wall 65 of the annular recess and the cylindrical wall of the piston having a gradually increasing thickness in the direction of the base of the recess 60. The flexible lip 64 is operative to flex radially inwardly an amount sufficient to accommodate the interference fit between the piston 40 and the walls of the receptacle chamber 24 when the piston is driven down into the pressure chamber 24 to pressurize the fluid 28 therein. However, as the fluid becomes pressurized it exerts a radially outwardly directed force against the recess wall 65 whereby the lip 64 is thereby urged into engagement with the walls of the bore or chamber 24, thereby helping to maintain the fluid tight seal between the piston and the receptacle chamber walls during the pressurizing cycle. It will, of course, be understood that the degree of flexibility of the lip 64 will depend on the modulus of elasticity of the metal and the shape and dimensions of the recess wall 65.

As previously stated, the powdered metal is compacted by positioning it in a suitable flexible container within the pressure chamber. However, it is desirable to provide a means for rapidly loading and unloading the work in the chamber to decrease the overall process cycle time of operation. As shown in FIGURE 1 of the drawings, this may be conveniently and advantageously accomplished by attaching the flexible container to the piston. This is accomplished by providing a threaded protruding portion 66 at the lower end of the piston 40 to which is secured a threaded ring member 68 having a key slot 70 therein. A generally cylindrical mandrel 72 having a key portion 74 is detachably engaged in the key slot 70 of the ring member 68 in a manner so that the mandrel may be readily loaded and unloaded from the piston.

In the embodiment shown in FIGURE 1, the metal powder 76 being compacted is located around the mandrel 72 and held in position by means of a generally cylindrical flexible bag 78 which is sealed at both ends by two annular plug members 80 and 82 positioned in circumferential frictional engagement around the mandrel on opposite sides of the powder to seal the powder within the flexible bag 78 and to secure the bag to the mandrel. The plugs 80 and 82 and the bag 84 are preferably made of a silicon rubber or similar flexible material which will not bind to the metal powder or interfere with the desired compaction of the powder in the pressure chamber during operation. FIGURE 3 of the drawing illustrates a compacted powdered metal article 86 which can be made using the mandrel, bag and plug loading and unloading assembly shown in FIGURE 1 of the drawing. Of course, it should be appreciated that the hydrostatic compaction device of the present invention may be used to make a wide variety of compacted metal articles of many different shapes using several types of flexible containers and metal powders, such as iron, steel, copper, aluminum and tungsten powder.

The resolution of forces acting on the receptacle 22, retaining block 10, piston 40 and the fluid 28 in the pressure chamber 24 during operation of the subject device which results in the maintenace of the desired fluid-tight seal between the piston 40 and the pressure chamber walls 60 may vary somewhat in accordance with the present invention, since these seal-maintaining forces are dependent on several factors. As will hereinafter be more fully explained, these factors include certain design characteristics of the metal parts of the assembly, such as the piston configuration, the shape, size and wall thickness of the retaining block and receptacle, the modulus of elasticity of these metal parts, the operating pressure exerted on the fluid in the pressure chamber and the degree of slope of the conical bore 18 in the retaining block 10 and of the outer conical wall 26 of the receptacle. Of course, the receptacle 22, retaining block 10 and piston 40 may be made from the same or different metals, although they preferably are made of relatively hard, strong and highly resilient metals, such as an SAE 4340 steel.

Moreover, it should be appreciated that since the receptacle is wedged deeper into the conical bore of the retaining block 10 while the fluid is being pressurized, radially outwardly directed forces are exerted on the inner receptacle walls 60 by the pressurized fluid which tend to expand the center portion 71 of the receptable walls 25 and simultaneously compensating radially inwardly directed forces are exerted on the outer conical receptacle wall 26 by the retaining member 10. Also, while the exact nature and degree of the elastic deformation of the receptacle 22 and the retaining block 10 during the pressurizing cycle of operation is not precisely known, it is believed that the retaining block conical wall deforms to a very slight degree as indicated by the dotted lines 75. It should be appreciated that the receptacle 22 is not deformed significantly compared to the retaining block 10 since the diameter of the bore of the receptacle 22 is maintained substantially constant during the compacting operation. The degree of elastic deformation indicated by the dotted line 75 is greatly exaggerated in the drawing for purposes of illustration.

In accordance with the present invention, the upper portion 77 of the inner receptacle wall 60 must be maintained in a self-sustaining, fluid-tight seal with the flexible lip portion 64 of the piston 40 to prevent leakage of the fluid 28 from the pressure chamber 24 during the pressurizing cycle of operation. The seal is maintained due to the wedging action between receptacle 22 and the retaining block 10 whereby the bore of the receptacle 22 is maintained constant as previously described. Moreover, as previously mentioned, the fluid pressure on the recess surface 65 assists in maintaining the flexible lip portion 64 of the piston in sealing relation with the receptacle bore.

As previously mentioned, the outer lower wall portion 27 of the receptacle 22 is tapered at a sufficiently greater angle than the taper of the conical bore 18 of the retaining block 10 to prevent the locking of the receptacle in the bore, thereby permitting the receptacle 22 to be wedged deeper into the bore during the pressurizing cycle of operation. Also, the lower portion 24 of the pressure chamber defining wall is preferably rounded to better equalize stresses in the receptacle walls.

In practice, the subject hydrostatic compaction device of the present invention may be used in the following manner. The metal powder 76 to be compacted is first loaded in the flexible bag 80 around the mandrel 72 and the mandrel is then loaded on the piston 40 in the aforementioned manner. The piston 40 is then driven by the driving member 46 into the pressure chamber so that the piston snugly and circumferentially engages the walls 60 of the chamber. As the piston is driven down into the chamber, the fluid in the chamber becomes highly pressurized and this pressure compacts the metal powder 76 located in the flexible bag 80. However, as previously described, a self-sustaining, fluid-tight seal is formed between the piston and the receptacle pressure chamber walls.

Thus, the subject hydrostatic compaction device provides a method of maintaining a self-sustaining, fluid-tight seal between the piston and the pressure chamber walls both at very low and at very high fluid pressures, thereby eliminating the use of elaborate and expensive sealing means which are commonly used with conventional hydrostatic compaction devices. Such a device has been operated at pressures ranging up to about 120,000 p.s.i. to form very dense powdered metal compacts of various powdered metals, such as iron, steel, copper, aluminum and tungsten powder. Upon completion of the compaction or pressurizing cycle of operation, the externally powered driving member 46 is raised, thereby pulling the piston out of the pressure chamber and permitting the receptacle 22 to rise to its initial position. The compacted powder may be quickly unloaded and a new workload of metal powder quickly loaded on the piston before the piston is again driven into the pressure chamber for the next pressurizing cycle. The receptacle 22 is automatically returned to its initial position in the conical bore 18 of the retaining block 10. This is due to the release of the fluid pressure on the bottom of the conical receptacle 22 and block 10 returning to its original configuration when the pressure thereon is removed to thereby exert an upward springlike action on the receptacle since the block 10 is elastically deformed only within its elastic limit.

Another embodiment of the subject hydrostatic compaction device of the present invention is shown in FIGURE 2 of the drawing, and the same numbers are used for the parts of this embodiment which correspond to the same parts of the embodiment shown in FIGURE 1. As shown in FIGURE 2, a piston 90 is provided with a conventional labyrinth-type seal arrangement which consists of a plurality of closely spaced annular grooves 92 located around the lower portion of the piston. The piston 90 should be machined within close tolerances to the same diameter as the pressure chamber so that the piston snugly fits the chamber walls 60. During the pressurizing or compaction cycle of operation, a pressure gradient is established across the series of grooves along the piston walls when the piston is driven into the pressure chamber which permits the desired amount of pressure to be built up and maintained on the fluid in the chamber. Hence, a very minor amount of leakage of the fluid from the chamber may occur during operation as long as this leakage does not prevent the buildup of the desired pressure for compacting the metal powder positioned in the flexible container in the fluid.

However, as in the case of the embodiment shown in FIGURE 1 of the drawing, the leakage of the fluid from the pressure chamber is greatly minimized or prevented in accordance with the present invention since the diameter of the pressure chamber of the receptacle is maintained constant. Also, as shown in FIGURE 2 of the drawing, the lower portion of the piston 90 may be provided with a key slot 94 to permit the rapid loading and unloading of the mandrel 72 with the metal powder being compacted in the same manner as the embodiment shown in FIGURE 1 of the drawing.

While the invention has been described in terms of certain specific embodiments thereof, it is not intended to be limited thereby, and it should be understood that other variations apparent to those skilled in the art are within the intended scope of this invention as defined by the following claims.

We claim:
1. A method for hydrostatically compacting metal pow- der comprising positioning said metal powder within a flexible container in a desired shape, suspending said container in a cylindrical pressure chamber defined by walls in a receptacle having a generally conical outer wall, driving a cylindrical piston into said chamber to exert a sufficient pressure on said fluid to compact said metal powder within said container, and simultaneously exerting a pressure on said outer conical wall of said receptacle by wedging said receptacle down into a conical bore of a retaining block by the force of said piston so that the pressures on said outer conical wall of said receptacle and said chamber defining walls of said receptacle are offset whereby deformation of said receptacle is substantially prevented and a fluid-tight seal is maintained betwene said piston and said pressure chamber.

2. A device for hydrostatically compacting metal powder, said device comprising a resilient metal receptacle having a generally conical outer wall and a cylindrical inner wall, said inner wall defining a pressure chamber in said receptacle containing a fluid for hydrostatically compacting said metal powder, a resilient metal block having a frusto-conical bore therein in which said receptacle is freely but snugly positioned, a cylindrical piston snugly fitting said inner wall defining said chamber and adapted to be driven into said chamber to exert pressure on said fluid, said receptacle being adapted to be wedged deeper into said bore of said block in response to the force exerted by said piston when said piston is pressurizing said fluid in said chamber so that the pressure on said pressure chamber walls are offset by said block, thereby maintaining the diameter of said pressure chamber constant and maintaining an effective seal between said piston and said pressure chamber, and a flexible container for supporting said metal powder in said fluid while said fluid is being pressurized.

3. A hydrostatic compaction device for forming a compacted powdered metal article, said device comprising a generally frusto-conical-shaped resilient metal receptacle having a cylindrical pressure chamber therein which is open at one end thereof and contains a liquid, a resilient metal retaining block having a conical bore therein in which said receptacle is freely but snugly positioned, a cylindrical piston adapted to be driven into said chamber to exert a pressure on said liquid, the lower portion of said piston having an integral annular flexible lip portion adapted to snugly engage the walls defining said cylindrical pressure chamber so that a fluid-tight seal is formed between said lip portion and said walls defining said chamber to prevent leakage of said liquid from said chamber during operation of said device, said receptacle being adapted to be wedged deeper into said bore of said retaining block in response to the force exerted by said piston when said liquid is being pressurized so that the inwardly directed pressure exerted on the outer walls of said receptacle due to said wedging action compensates for the opposed outwardly directed pressure exerted on said chamber defining walls in said receptacle due to said liquid being pressurized to maintain a self-sustaining, fluid-tight seal between said piston and said chamber defining walls when said liquid is being pressurized to compact the metal powder positioned therein, and flexible container means for holding said metal powder and positioning said metal powder in said liquid.

4. A hydrostatic compaction device for forming compacted powdered metal articles, said device comprising a generally frusto-conical-shaped, elastically deformable, metal receptacle having a cylindrical pressure chamber therein defined by walls which is open at one end and contains a liquid, a resilient metal retaining block having a conical bore therein in which said receptacle is freely but snugly positioned, a cylindrical piston snugly fitting the walls of said receptacle defining said chamber and adapted to be driven into said chamber to exert a pressure on said liquid, said piston having a plurality of coaxially aligned annular grooves in its lower portion so that a pressure gradient is established between said grooves which permits the desired amount of pressure to be built up and maintained by said piston on said liquid in said chamber while said fluid is being pressurized during operation, said receptacle being adapted to be wedged deeper into said bore of said retaining block in response to the force exerted by said piston when said liquid is being pressurized by said piston so that the inwardly directed pressure exerted on the outer walls of said receptacle due to said wedging action compensates for the opposed outwardly directed pressure on said walls defining said chamber, thereby minimizing leakage of said liquid between said piston and said walls defining said chamber when said liquid is being pressurized by said piston to compact the metal powder positioned therein, and flexible container means for holding said metal powder and positioning said metal powder in said liquid.

5. A hydrostatic compaction device for forming powdered metal compacts, said device comprising a generally frusto-conical-shaped, resilient metal receptacle having a cylindrical pressure chamber therein which is defined by walls and open at one end, said chamber containing a liquid, a metal retaining block having a conical bore therein in which said receptacle is freely and snugly positioned, a generally cylindrical piston adpted to be driven into said chamber to exert a pressure on said liquid, means for actuating said piston to drive it into said opening in said chamber and to retract it therefrom, the working end of said piston having an integral annular flexible lip portion adapted to form a slight interference fit with said chamber defining walls so that a fluid-tight seal is formed between the outer peripheral walls of said lip portion and said chamber defining walls to prevent leakage of said liquid from said chamber during the pressurizing cycle of operation of said device, and flexible container means for holding the metal powder to be compacted and adapted to be detachably secured on the lower end of said piston so that said container means is positioned in said liquid when said piston is driven into said chamber during said pressurizing cycle of operation, said receptacle being adapted to be wedged deeper into said bore of said retaining block in response to the force exerted by said piston when said liquid is being pressurized so that the outwardly directed pressure exerted on the outer walls of said receptacle due to said wedging action compensates for and offsets the pressure exerted on said chamber defining walls of said receptacle resulting from said liquid being pressurized whereby the diameter of said chamber is maintained constant, said compensation of said pressures acting on said outer and inner walls of said receptacle and the pressurized fluid acting on said lips maintaining a self-sustaining fluid-tight seal between said piston and said chamber defining walls when said liquid is being pressurized to compact said metal powder positioned therein in said flexible container means.

6. A hydrostatic compaction device as defined by claim 5 wherein said flexible container means for holding said metal powder to said lower end of said piston comprises an elongated mandrel adapted to be attached to said piston, and a flexible mold surrounding said mandrel and supported thereby adapted to support said metal powder to be compacted in a desired shape.

7. A hydrostatic compaction device for making powdered metal compacts, said device comprising a resilient metal receptacle having an outer frusto-conical wall and a coaxially aligned cylindrical chamber therein forming a pressure chamber adapted to contain a fluid, said pressure chamber being open at its upper end and closed by a partially spherical wall at its lower end, the upper portion of said outer conical wall of said receptacle having a taper angle ranging between about 2° to about 10° to the vertical axis of said receptacle and the lower portion of said outer conical wall of the said receptacle having a greater degree of taper than said upper portion, a piston snugly fitting said pressure chamber adapted to be driven into said chamber and to exert a pressure on said fluid, a resilient metal retaining block having a conical bore therein of the same degree of taper as said upper portion of said outer conical wall defining said receptacle, said receptacle being freely but snugly positioned in said conical bore and adapted to be wedged deeper into said bore in response to the force exerted by said piston when said fluid is being pressurized, thereby maintaining a fluid-tight seal between said piston and said inner cylindrical wall of said receptacle defining said pressure chamber, and flexible container means for holding said powder in said fluid so that said powder is compact therein when said fluid is being pressurized.

References Cited by the Examiner

UNITED STATES PATENTS

| | | | |
|---|---|---|---|
| 2,200,546 | 5/1940 | Furman | 285—10 |
| 2,582,922 | 1/1952 | Crowley et al. | 18—16 |
| 2,648,125 | 7/1953 | McKenna et al. | 264—84 |
| 3,054,422 | 9/1962 | Napolitano | 285—110 |
| 3,098,662 | 7/1963 | Iverson | 285 |
| 3,230,286 | 1/1966 | Bobrowsky | 18—16 |

ALEXANDER H. BRODMERK, *Primary Examiner.*

ROBERT F. WHITE, *Examiner.*

J. R. HALL, *Assistant Examiner.*